Jan. 4, 1944. G. WOOD 2,338,679
FUEL INJECTOR FOR INTERNAL COMBUSTION ENGINES
Filed March 25, 1942

INVENTOR.
George Wood
BY Louis Chayka
ATTORNEY.

Patented Jan. 4, 1944

2,338,679

UNITED STATES PATENT OFFICE 2,338,679

FUEL INJECTOR FOR INTERNAL COMBUSTION ENGINES

George Wood, Detroit, Mich.

Application March 25, 1942, Serial No. 436,099

3 Claims. (Cl. 299—107.3)

The purpose of my invention is to increase the efficiency of the conventional internal combustion engine; to secure a uniform output of power under all practical driving conditions, and to effect economy of fuel by causing its combustion to take place under conditions most conducive to full utilization of energy created thereby. Specifically, the purpose of my invention is to control the quantity of fuel to be injected into the respective cylinder of the engine and consequently to control the volume of mixture of air and fuel to be ignited and this irrespective of the total volume of air in the cylinder preceding the moment of ignition.

My further purpose is to approximate ideal conditions of combustion under full pressure of air and at the moment when the mixture of air and fuel within a defined area is at the best practical ratio.

My further purpose is to control the speed and the output of the engine by means of controlling the amount of fuel injected into the engine rather than by throttling the incoming charge, which in turn affects the final compression ratio at the time when combustion takes place.

I wish to point out at this juncture that in the engine equipped with my injector, the intake valve admits air alone, and that the use of a throttle for the purpose of controlling admission of air and fuel into the intake manifold of the engine is not contemplated.

I shall now describe my invention with reference to the accompanying drawing in which Fig. 1 is a sectional fragmentary view of the upper part of an internal combustion engine including a cylinder, a piston and my injector;

Similar numerals refer to similar parts throughout the several views.

Figure 1:
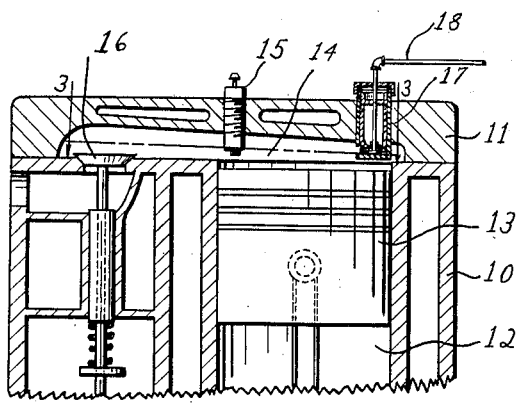
Figure 3:
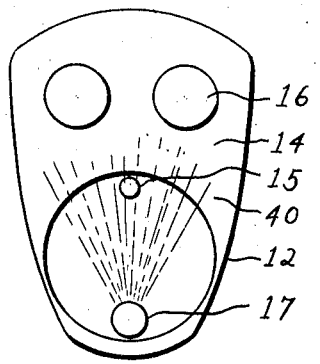
Fig. 3 is the outline of the space within the cylinder head, shown in Fig. 1, in a horizontal plane on line 3—3, indicated therein, into which space fuel is injected.
Figure 4:
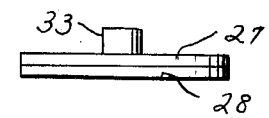
Fig. 4 is a side view of disk elements forming a part of my injector.

In the sectional view of the upper part of a gasoline engine, shown in Fig. 1, numeral 10 indicates the cylinder block, 11 is the cylinder head, 12 is a cylinder, 13 is a piston, 15 is a spark plug and 16 is a valve. The space between the cylinder block 10 and the cylinder head 11 is indicated by numeral 14. Seated within said head 11, and partly extending into said space 14, is my fuel injector 17. Numeral 18 indicates a tube which supplies the necessary fuel to the injector.

Figure 2:
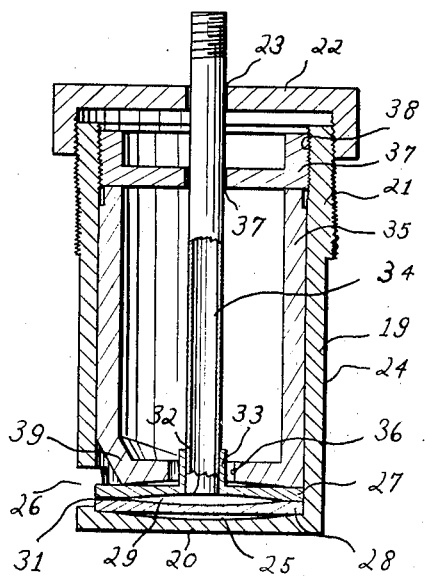
Fig. 2 is an enlarged, vertical sectional view of my fuel injector shown in Fig. 1.

The injector, shown in detail in Fig. 2, comprises a cylindrical casing 19, open at one end which may be considered its top, and forming a bottom 20 at the other end. The upper part 21 of the casing is threaded on its outer surface. This serves as a means whereby the casing may be secured within the cylinder head 11, and as a means whereby the open end of the casing may be closed by an internally threaded cap 22. The cap is provided with an axial aperture 23. The diameter of the lower part 24 is somewhat reduced as shown in Fig. 2. On one side close to bottom 20, a part of the wall of the casing is cut out to provide a gate 26. The bottom is depressed in the middle to form a dish-like concavity 25.

Figure 5:
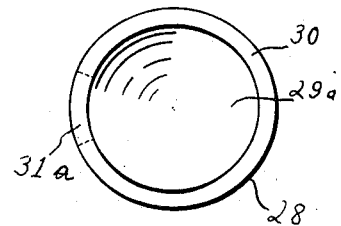
Fig. 5 is a plan view of one of the disks shown in Fig. 4.

Disposed within said casing 19, and supported by bottom 20, are two, axially aligned disks 27 and 28, one of them being superimposed on the other. As each disk is concave on its inner surface, that is the surface facing the other disk, a lens-shaped cavity or chamber 29 is formed between them as shown in Fig. 2. The disks are made of metal but are thin enough to be capable of being flexed outwardly under pressure, and resilient enough to resume their normal position when the pressure has subsided. In order to provide a perfect seal around the edges of the disks, the annular rim 30 on each disk is level and smooth to form a perfectly abutting surface for the corresponding rim opposite thereto. This is shown in Fig. 5 wherein rim 30 circumscribes the central concave portion 29a of disk 28. A segment 31a of said rim 30, defined by dotted lines, indicates a portion of the rim which may be forced apart under pressure of fuel from a corresponding portion of the opposite rim to provide an orifice 31, better shown in Fig. 2. It is through this orifice that fuel is injected into the combustion chamber of the engine. An axially located opening 32 in the upper disk 27, serves as an inlet into space 29 between the disks. Numeral 33 indicates a bushing by means of which tube 34, being an extention of tube 18, may be connected to said upper disk 27.

The disks are kept in their relative position shown in Fig. 2 by means of a sleeve 35 seated within the casing 19. The sleeve has a hollowed bottom, that is a bottom which is concave on its lower surface, and is provided with an axial opening 36 to accommodate the above mentioned bushing 33. An annular member 37, threaded on the outside and seated within the correspondingly threaded portion 38 of casing 19, is made to bear against the upper end of sleeve 35 and by means of said sleeve against the upper disk 27. In this manner the rims of the disks are thoroughly sealed against leakage. It will be noted that the bottom of sleeve 35 is set back on the side opposite gate 26 in order to reduce on this side, the pressure of the sleeve on the upper disk. The bottom, as shown in Fig. 2, is connected with the side wall of the sleeve by a diagonally extending member 39.

It will be understood that fuel is to be delivered to my injector under pressure and that the pressure will be generated by means of a reciprocating piston or other suitable means, and that it will be transmitted in pulsating surges, timed to the movement of the piston within the cylinder of the engine to which cylinder fuel is to be injected.

I shall now describe the operation of the engine with reference to the performance of my injector forming a part thereof. As will be noted in the drawing, my injector is placed at the converging or narrow end of space 14, the whole space having the approximate shape of a partly extended fan or that of letter V. The spark plug 15 is located approximately midway between the wider end of space 14 and my injector 17. The engine is provided in accordance with the standard design with two valves, the intake and the exhaust valve respectively. Only one of them, the intake valve 16 is shown in the drawing, and it is through this valve that air is delivered to the cylinder of the engine. As under certain conditions, particularly when the engine is run at high speed, a throttle which is ordinarily built into the air supply conduit, impedes the easy and full flow of air into the cylinders of the engine, I have eliminated it entirely. By reason of this elimination of the throttle air is delivered into the cylinders under full atmospheric pressure.

For the purpose of describing the operation of the engine, it may be assumed that the drawing in Fig. 1 shows piston 13 approaching the end of its up-stroke when air, admitted through valve 16, has been greatly compressed. At this moment a quantity of fuel is delivered from a pump, under pressure, by means of pipe 18 and tube 34, into cavity 29 between disks 27 and 28. The sudden surge of fuel distends the disks and seeking release, pries them open along segment 31a, forming an orifice 31. As pressure within the cavity subsides, the disks return to their normal position, exerting pressure on the fuel remaining within. The fuel ejected through the orifice is delivered, owing to the shape thereof in a fan-like spray, marked 40, in a plane parallel to the top of the piston. At the instant when the full charge of fuel has been sprayed and mixed with air, the mixture is ignited by a spark from the spark plug which is timed to the above requirements. It hardly needs to be stated that the speed of the operation of the engine and its output may be controlled by the quantity of fuel discharged by my injector or injectors as the case may be.

There are certain important features bearing on the action of my injector which ought to be stressed at this point. It will be obvious that the reach of the sprayed fuel in the direction of the spark plug and the width of the fan-wise spray of fuel will depend upon the pressure under which said fuel is delivered to the injector and that they may be varied according to the degree of speed desired. Specifically the angle of the fan-wise spray of fuel may vary, say, from 30 to 60 degrees and fuel may be projected to distances beyond the spark plug. As for the variation of pressure, it may be secured by the simple expedient of varying the piston stroke of the pump which delivers the fuel to the injector.

As pointed out, fuel is injected into the respective cylinder at the time when the air within has been fully or almost fully compressed. As the quantity of fuel injected and the area of the spray are in a direct ratio, that is, as the area of the spray varies only with the quantity of fuel injected, the proportion of fuel and air within the area sprayed will be uniform without regard to the volume of air outside that area. What this amounts to is that only a certain part of the volume of air may be commingled with the sprayed fluid, that is fuel, and ignited before it has had time to thin out by diffusion throughout the remaining volume of air. However, the area permeated with fuel will be at the most desirable ratio, say 1 to 14, which means that ignition will take place under conditions most productive of power and economy of fuel.

I am not describing the pump which is to deliver fuel to my injector, but am contemplating one in which the quantity of fuel and the pressure with which it is to be delivered with, say, each stroke of the piston, may be adjusted. Such pumps being already known, any of them, being suitable for the purpose may be used in conjunction with my injector.

It will be seen from the above specification that my invention covers not only the injector alone but also a method of operation of internal combustion engines equipped with my injectors. As for the injector alone, it is obvious that some changes may be made in its construction and combination of its parts without departing from the main inventive idea disclosed herein. What I, therefore, wish to claim with respect to the operation and to the construction of my injector, is as follows:

1. A fuel injector for internal combustion engines comprising a casing means on the casing to secure it within the combustion chamber of the respective engine, the lower end of the casing being provided, on one side, with an open gate, a fuel container within the casing, consisting of two abutting disks, hollowed on their opposed surfaces, means to keep the disks in liquid-tight abutment along their respective rims except a segment facing said gate, a tube to convey fuel to said container under sufficient pressure to pry the disk apart on the side facing the gate to form a lateral orifice to emit said fuel.

2. A fuel injector for internal combustion engines, comprising a casing, provided with an open gate on one side of its lower end, two co-axially disposed disks placed in the casing transversely thereof and opposite said gate, a sleeve within the casing bearing against the upper disk with exception of a segment thereof, opposite said gate, a tube to convey liquid fuel between the inner surfaces of said disks, and under pressure, to pry the disks apart on the side opposite said gate to form a lateral orifice allowing said fuel to be sprayed outwardly.

3. An injector for internal combustion engines, comprising a casing, the lower part of which is provided with an open gate on one side thereof, a fuel chamber within the casing consisting of two abutting disks hollowed on their inside surfaces, means to keep the disks in liquid tight abutment along their respective rims except a segment facing said gate, a tube to convey fuel to said chamber under sufficient pressure to pry the disks apart on the side facing the gate to form a lateral orifice for emission of said fuel.

GEORGE WOOD.